(12) United States Patent
van Groenestijn

(10) Patent No.: US 10,534,102 B2
(45) Date of Patent: Jan. 14, 2020

(54) DEBLENDED AND DEGHOSTED SEISMIC DATA

(71) Applicant: PGS Geophysical AS, Oslo (NO)

(72) Inventor: Gert-Jan Adriaan van Groenestijn, Rijswijk (NL)

(73) Assignee: PGS Geophysical AS, Oslo (NO)

( * ) Notice: Subject to any disclaimer, the term of this patent is extended or adjusted under 35 U.S.C. 154(b) by 58 days.

(21) Appl. No.: 15/326,806

(22) PCT Filed: Dec. 18, 2015

(86) PCT No.: PCT/EP2015/080501
§ 371 (c)(1),
(2) Date: Jan. 17, 2017

(87) PCT Pub. No.: WO2016/097295
PCT Pub. Date: Jun. 23, 2016

(65) Prior Publication Data
US 2017/0276817 A1 Sep. 28, 2017

Related U.S. Application Data

(60) Provisional application No. 62/093,600, filed on Dec. 18, 2014.

(51) Int. Cl.
*G01V 1/36* (2006.01)
*G01V 1/38* (2006.01)

(52) U.S. Cl.
CPC ............ *G01V 1/364* (2013.01); *G01V 1/38* (2013.01); *G01V 2210/121* (2013.01); *G01V 2210/127* (2013.01); *G01V 2210/1423* (2013.01); *G01V 2210/20* (2013.01); *G01V 2210/56* (2013.01)

(58) Field of Classification Search
CPC .... G01V 1/364; G01V 1/38; G01V 2210/127; G01V 2210/121; G01V 2210/56; G01V 2210/20; G01V 2210/1423
USPC .......................................................... 367/24
See application file for complete search history.

(56) References Cited

U.S. PATENT DOCUMENTS

| 6,493,636 | B1 | 12/2002 | DeKok | |
|---|---|---|---|---|
| 7,426,438 | B1 * | 9/2008 | Robertsson | ............ G06Q 30/06 702/14 |
| 8,321,134 | B2 * | 11/2012 | Al-Saleh | ................ G01V 1/364 702/14 |

(Continued)

FOREIGN PATENT DOCUMENTS

| EP | 2703848 | 3/2014 |
|---|---|---|
| EP | 2728383 | 5/2014 |

(Continued)

OTHER PUBLICATIONS

Partial Search Report for related PCT Application PCT/EP2015/080501, dated Apr. 11, 2016 (8 pgs).

(Continued)

*Primary Examiner* — Daniel L Murphy

(57) ABSTRACT

Deblending and deghosting seismic data may include processing blended seismic data acquired after actuation of a first seismic source located at a first depth and a second seismic source located at a second depth. The processing may comprise deblending and deghosting the blended seismic data based on a difference in ghost responses of the first seismic source and the second seismic source.

19 Claims, 6 Drawing Sheets

(56) References Cited

U.S. PATENT DOCUMENTS

| | | | |
|---|---|---|---|
| 2010/0299070 A1* | 11/2010 | Abma | G01V 1/005 702/14 |
| 2013/0135966 A1* | 5/2013 | Rommel | G01V 1/3808 367/24 |
| 2016/0187513 A1* | 6/2016 | Poole | G01V 1/362 702/16 |

FOREIGN PATENT DOCUMENTS

| | | |
|---|---|---|
| WO | 2010018189 | 2/2010 |
| WO | 2014133509 | 9/2014 |

OTHER PUBLICATIONS

International Search Report & Written Opinion for related PCT Application PCT/EP2015/080501, dated Jun. 16, 2016 (20 pgs).

Bai, et al., "Ghost effect analysis and bootstrap deghosting application on marine streamer data"; 75th EAGE Conference & Exhibition Incorporating SPE EUROPEC 2013; London, UK (Jun. 10-13, 2013) (6 pgs).

Moldoveanu, et al., "Over/under towed-streamer acquisition: A method to extend seismic bandwidth to both higher and lower frequencies"; The Leading Edge, Society of Exploration Geophysicists, vol. 26, No. 1 (Jan. 1, 2007) (20 pgs).

Doulgeris, "Inversion methods for the separation of blended data"; (Jan. 14, 2013) (136 pgs) http://repository.tudelft.nl/assets/uuid:0820cec3-c497-4c53-b680-3bleaaade0b6/Doulgeris_thesis.pdf.

Berkhout, et al., "Combining Deblending with Source Deghosting"; 76th EAGE Conference & Exhibition 2014, Amsterdamn RAI, The Neatherlands (Jun. 16-19, 2014) (6 pgs).

Van Groenestijn, et al., "Using Surface Multiples to Estimate Primaries by Sparse Inversion from Blended Data"; 2010 European Association of Geoscientists and Engineers, Geophysical Prospecting, vol. 59, No. 1, pp. 10-23 (14 pgs).

International Preliminary Report on Patentability for related PCT Application PCT/EP2015/080501, dated Jun. 29, 2017 (12 pgs).

* cited by examiner

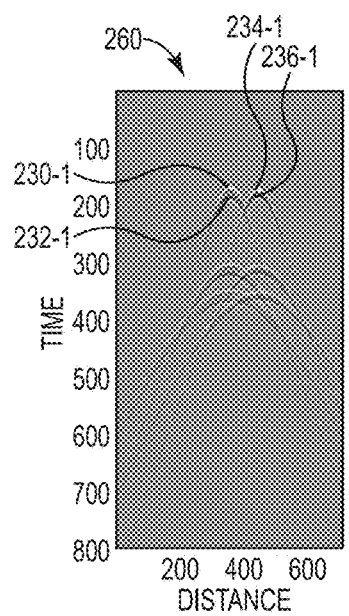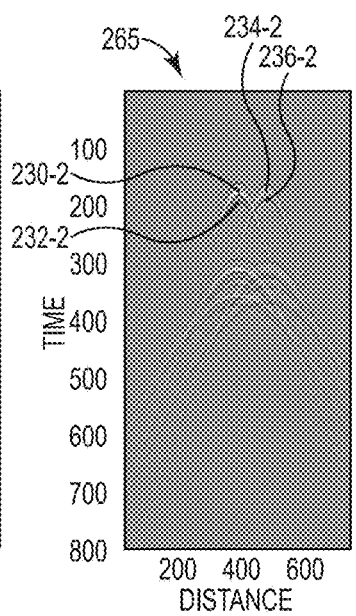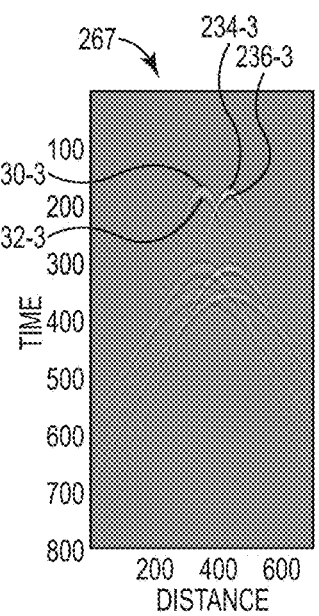
Fig. 2A  Fig. 2B  Fig. 2C
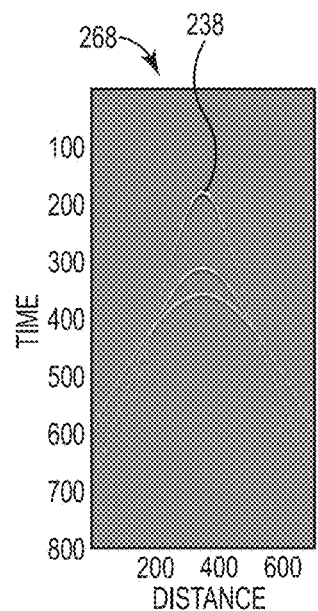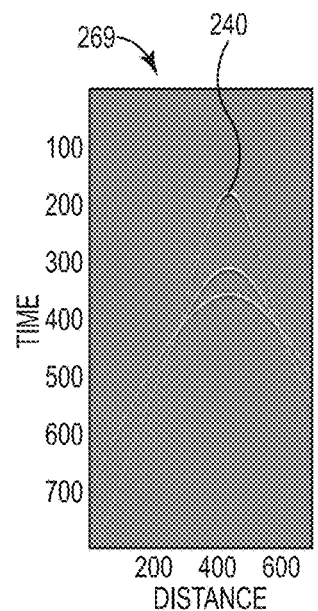
Fig. 2D  Fig. 2E

DEBLENDED AND DEGHOSTED SEISMIC DATA

CROSS-REFERENCE TO RELATED APPLICATIONS

This application is a National Stage Application under 35 U.S.C. § 371 of International Application Number PCT/EP2015/080501, filed Dec. 18, 2015 and published as WO 2016/097295 on Jun. 23, 2016, which claims the benefit to U.S. Provisional Application 62/093,600, filed Dec. 18, 2014, the entire contents of which are incorporated herein by reference in its entirety.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface of the water and over a subterranean formation to be surveyed for mineral deposits. Receivers may be located on or near the seafloor, on one or more cables towed by the same or another marine survey vessel, or on one or more cables towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

BRIEF DESCRIPTION OF THE DRAWINGS

FIGS. 2A-2E illustrate data graphs associated with deblended and deghosted seismic data.

DETAILED DESCRIPTION

Figure 1:
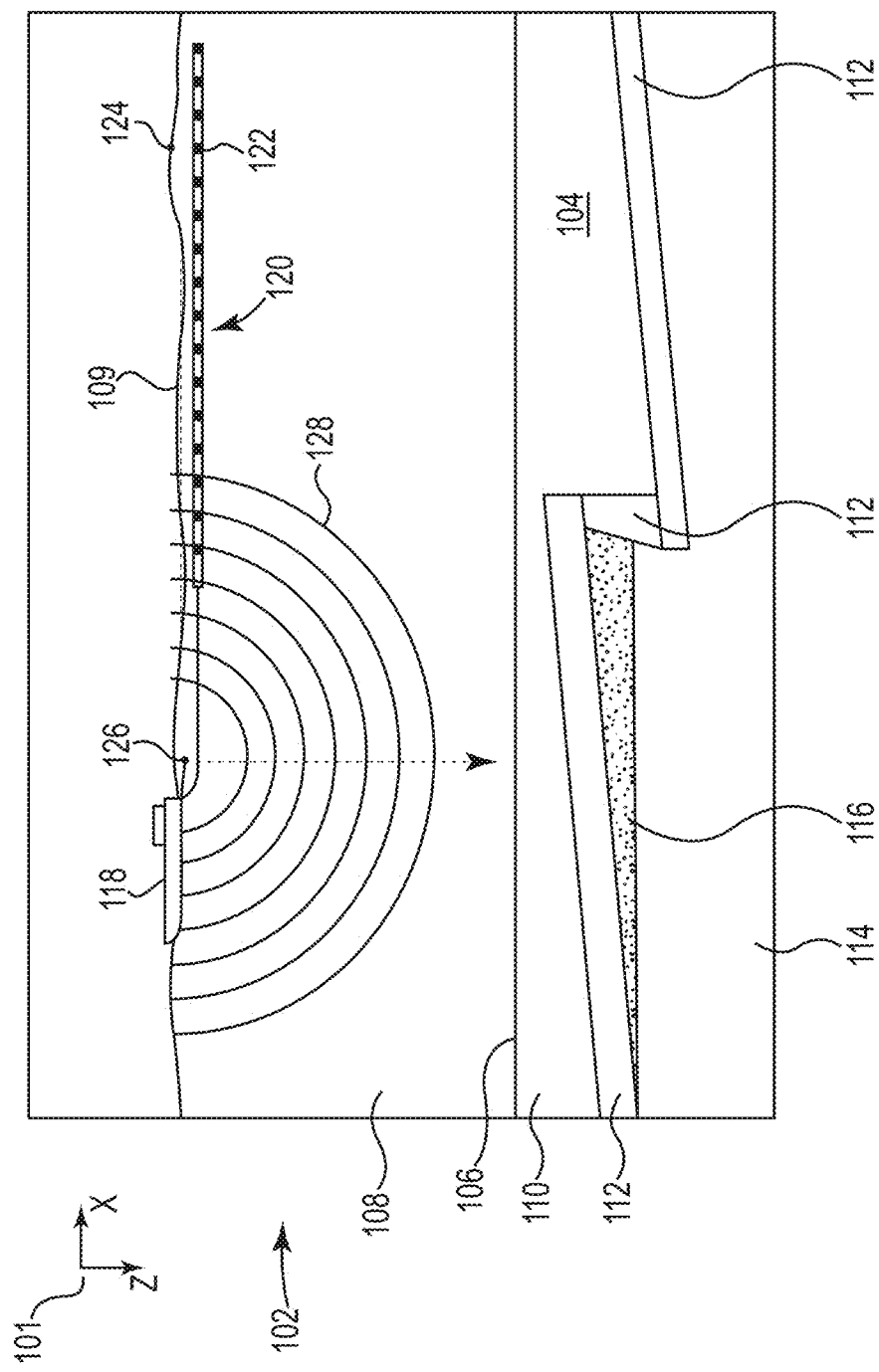
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the solid surface of the subterranean formation.

The present disclosure is related to deblending and deghosting of seismic data. For example, a number of seismic sources may be actuated, resulting in a number of ghosts, each ghost associated with a seismic source. As used herein, associated means connected to, in communication with, related to, and/or corresponding to, though embodiments are not so limited. Seismic data, as used herein may include source and receiver wavefields and may be acquisition data. Seismic data collected as a result of the actuations may be collected as blended data. That blended data may be processed, and the processing may include deblending and deghosting the seismic data.

As used herein, ghosts are delayed reflections trailing a seismic source actuation. A ghost results from reflections from a sea surface. Ghosts may interfere with primary reflections, limiting useable bandwidth and integrity of seismic data. When associated with blended seismic data, they may be referred to as interfering blended seismic source responses (associated with the seismic source) or interfering blended seismic ghost responses (associated with a ghost). Seismic data resolution may be degraded by the presence of ghosts.

As used herein, deghosting is the removal of a ghost from seismic data. Deghosting, for instance, may be performed using a number of different deghosting algorithms. Deblending, as used herein, is the separation of blended seismic data. For instance, seismic data may be collected from multiple seismic source actuations. This seismic data and associated ghosts may be blended as it is collected. Blending may occur because of overlapping actuations or simultaneous actuations. Additionally, blending may occur because of overlapping or simultaneous collection of seismic data. The seismic data and associated ghosts may be deblended, or separated, in some examples to make the data compatible with deghosting algorithms. Deghosting algorithms may use single seismic source and/or ghost inputs, and deblending seismic data and associated ghosts may allow for this.

As used herein, a "seismic source" refers to one or more single source devices, arranged as a source element, source unit, or source array. A source element is a single source device, such as an air gun or marine vibrator. A source unit is a plurality of source elements that are actuated together. A source array is a plurality of source elements or a plurality of source units that may be actuated separately.

While some other approaches to deblending and/or deghosting utilize deblending by actuation repetition including the actuation of a seismic source multiple times on a same location in a blended experiment, examples of the present disclosure include deblending and deghosting without a repeated actuation. Further, deblending and deghosting in accordance with the present disclosure may include deblending and deghosting seismic data received as a result of more than one actuation. Deblending and deghosting in accordance with the present disclosure may deblend seismic data in a blended (or simultaneous seismic source) experiment, including blending seismic source ghosts. This may increase deblending performance for data coming from blended acquisitions, such as simultaneous long offset (SLO) and stacked configurations. As used herein, SLO refers to utilizing dithered actuation times of simultaneous seismic sources for acquiring long seismic data offsets. A stacked configuration is a configuration including one seismic source above another at a same location but different depths. In such configurations, the stacked seismic sources may be actuated at a certain time delay. The increase in deblending performance may lead to more advanced blending acquisition designs.

It is to be understood the present disclosure is not limited to particular devices or methods, which may, of course, vary.

It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein may be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 101 view of marine seismic surveying in which acoustic signals are emitted by a seismic source for detecting and/or recording by seismic receivers for processing and analysis in order to help characterize the structures and distributions of features and materials underlying the solid surface of the subterranean formation. FIG. 1 shows a domain volume 102 comprising a solid volume 104 of sediment and rock below the solid surface 106 of the subterranean formation that, in turn, underlies a fluid volume 108 of water having a free surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116.

FIG. 1 shows an example of a marine survey vessel 118 equipped to carry out marine seismic surveys. In particular, the marine survey vessel 118 may tow one or more cables 120 (shown as one cable for ease of illustration) generally located near or below the free surface 109. In at least one embodiment, cable 120 is a seismic streamer. The cables 120 may be long cables containing power and data-transmission lines to which seismic receivers may be connected. In one type of marine seismic survey, each seismic receiver, such as the seismic receiver represented by the shaded disk 122 in FIG. 1, comprises a pair of seismic receivers including a sensor detecting particle motion, displacement velocity or acceleration, and a hydrophone that detects variations in pressure. The cables 120 and the marine survey vessel 118 may include sophisticated sensing electronics and data-processing facilities that allow seismic receiver readings to be correlated with absolute positions on the free surface and absolute three-dimensional (3D) positions with respect to a 3D coordinate system. In FIG. 1, the seismic receivers along the cables are shown to lie below the free surface 109, with the seismic receiver positions correlated with overlying surface positions, such as a surface position 124 correlated with the position of seismic receiver 122. The marine survey vessel 118 may also tow one or more seismic sources 126 that produce acoustic signals as the vessel 118 and towed cables 120 move along the free surface 109. Seismic sources 126 and/or cables 120 may also be towed by other vessels, or may be otherwise disposed in fluid volume 108. For example, seismic receivers may be located on ocean bottom cables or nodes fixed at or near the solid surface 106, and seismic sources 126 may also be disposed in a nearly-fixed or fixed configuration. Consequently, as used herein, "cable" should be read to refer equally to a towed receiver (a.k.a. sensor) cable as well as to an ocean bottom receiver cable.

FIG. 1 shows an expanding, spherical acoustic signal, represented by semicircles of increasing radius centered at the seismic source 126, such as semicircle 128, following an acoustic signal emitted by the seismic source 126. Although only one seismic source is illustrated in FIG. 1, one, two, or more seismic sources may be present. The acoustic signals are, in effect, shown in vertical plane cross section in FIG. 1. The outward and downward expanding acoustic signal may eventually reach the solid surface 106, at which point the outward and downward expanding acoustic signals may partially reflect from the solid surface and may partially refract downward into the solid volume, becoming elastic signals within the solid volume. Cables 120 are located a particular distance apart. This distance may be approximately consistent between all adjacent cables towed by a single vessel, some adjacent cables, or the distance may be inconsistent among cables. As used herein, "approximately" may include a distance within a particular margin, range, and/or threshold.

Examples of the present disclosure utilize seismic source actuations and their ghosts, in contrast to other approaches that utilize seismic source actuations and their repetitions (actuation repetition methods). Responses of a seismic source and its ghost may be seen as a form of blending two seismic sources together. In such an example, there may be not only a time delay between the two seismic sources, but also a spatial effect. A wavefield extrapolation may take both the spatial effect and the time delay into account such that the seismic source response and the ghost response may be summed after wavefield extrapolation. In response to the summation, an iterative thresholding scheme may estimate the deghosted/deblended seismic source response. For instance, actuation repetition may be replaced by the seismic source and its ghost.

FIGS. 2A-2E illustrate data graphs associated with deblended and deghosted seismic data. FIG. 2A illustrates data graph 260 including two seismic source responses and their ghost responses. The data in data graph 260 includes "blended" data. Data graph 260 illustrates results from two seismic sources actuated at the same time, referred to herein as a left seismic source and right seismic source. For instance, data graph 260 includes left seismic source response 230-1 and its ghost response 232-1. Ghost response 232-1, in this example, may be a source ghost. Data graph 260 also includes right seismic source response 234-1 and its ghost response 236-1. The time between source response 230-1 and ghost response 232-1 may differ from the time between source response 234-1 and ghost response 236-1. This difference may be present because the left seismic source may be at a particular depth, for instance 25 meters, while the right seismic source may be at a different particular depth, for instance, 16 meters. In the example illustrated in FIG. 2A, both the left and the right seismic source actuations have reflected at reflectors located at 200 meters, 310 meters and 380 meters.

For further processing, the data in FIG. 2A may be deblended. This may include estimating a deghosted version of the left seismic source, as illustrated in FIG. 2D and a deghosted version of the right seismic source, as illustrated in FIG. 2E.

In contrast to examples of deblending and deghosting in accordance with the present disclosure, other approaches to deghosting use data that is not blended. In such approaches, seismic source responses and their ghost responses are combined into responses that appear to be coming from a seismic source at a zero meter depth without any ghost response.

The deblending of the data in FIG. 2A may include an iterative process that makes use of the different ghost responses associated with the right and the left seismic sources.

FIG. 2B illustrates a data graph 265 including a strengthening of the seismic source responses 230-1. As used herein, a strengthened seismic source response includes a clearer and sharper response with greater focus, as compared to an unstrengthened seismic source response. Data graph 265 includes an illustration of a subtraction of the data in FIG. 2A after a backward extrapolation of 25 meters (shifting responses in data graph 260 upward) from the data in FIG. 2A after a forward extrapolation of 25 meters (shifting responses in data graph 260 downward). As a result, a forward extrapolation response 230-1 may be at the same location in data graph 265 as response 232-1 after backward extrapolation. The subtraction (a response 232-1 ghost value may have an opposite sign as a response 230-1 seismic source value) may be seen as a first portion of deghosting of the left seismic source.

FIG. 2C illustrates a data graph 267 including a strengthening of the right seismic source response 234-1. Also illustrated in FIGS. 2B and 2C are corresponding ghost responses 232-2, 236-2, 232-3 and 236-3. In the embodiment, response 230-2 is larger and clearer in data graph 265 as compared response 230-1, while response 234-2 is less clear than response 234-1 in data graph 260. In at least one embodiment, along with the subtraction, an inversion scheme may be used to strengthen responses.

FIGS. 2D and 2E illustrate data graphs 268 and 269, respectively, illustrating estimated deblended and deghosted seismic source responses. Response 238 is an estimated deblended and deghosted seismic source response associated with the left seismic source. Response 240 is an estimated deblended and deghosted seismic source response associated with the right seismic source. An inversion algorithm may be used to exploit the selective strengthening illustrated in FIGS. 2B and 2C to estimate individual deblended and deghosted seismic source responses like those illustrated in FIGS. 2D and 2E. In other words, the strengthened responses may be used to determine which seismic sources are generating energy and how much energy is generated at each seismic source. In an iterative inversion scheme, the strengthening may be used as the first steepest descend step. The iterative inversion scheme may try to explain the measured data in terms of the left deghosted and deblended source responses and the right deghosted and deblended source responses. In each iteration, it may use the strengthening for those parts of the data that it has not yet explained.

Figure 3A:
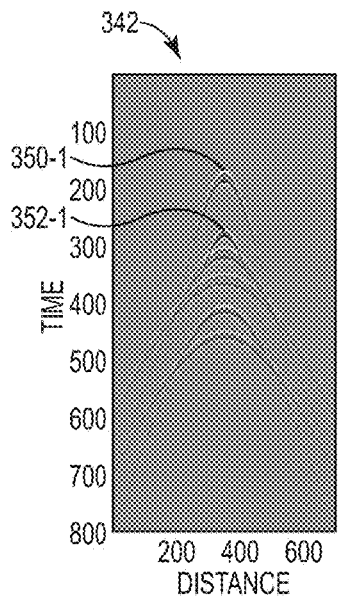
FIGS. 3A-3E illustrate data graphs associated with deblended and deghosted seismic data.

FIGS. 3A-3E illustrate data graphs associated with deblended and deghosted seismic data. FIG. 3A illustrates a blended stacked configuration data graph 342, with a first seismic source actuated at a particular depth, 25 meters in this example. In the example, a second seismic source is actuated at a particular depth, 16 meters in this example. Response 350-1 is associated with the first seismic source, and response 352-1 is associated with the second seismic source.

Figure 3B:
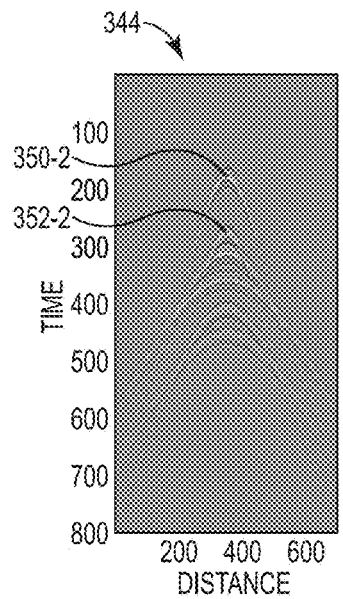

FIG. 3B illustrates a data graph 344 showing a strengthening of the responses of the first seismic source. For instance, response 350-2 is clearer and larger than response 350-1 illustrated in data graph 342. Response 352-2 is less clear than response 352-1 illustrated in data graph 342. By using wavefield extrapolations that consider a particular depth, followed by a subtraction, the seismic source response 350-2 associated with the first seismic source may be strengthened.

Figure 3C:
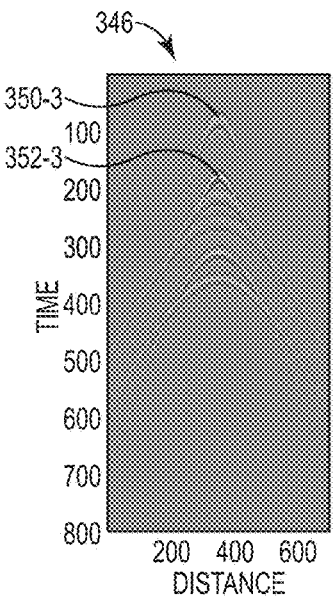

FIG. 3C illustrates a data graph 346 showing a strengthening of the responses of the second seismic source. For instance, response 352-3 is clearer and larger than response 352-1 illustrated in data graph 342. Response 350-3 is less clear than response 350-1 illustrated in data graph 342. By using wavefield extrapolations that consider a particular depth, followed by a subtraction, the seismic source response 352-3 associated with the second seismic source may be strengthened.

Figure 3D:
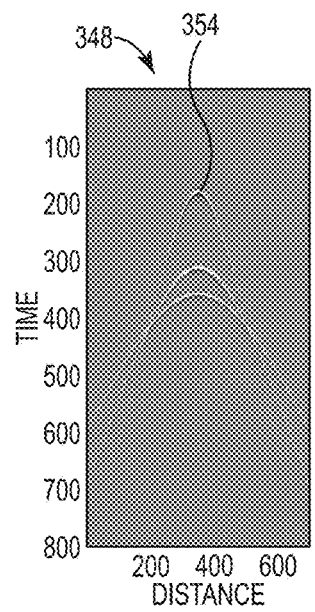
Figure 3E:
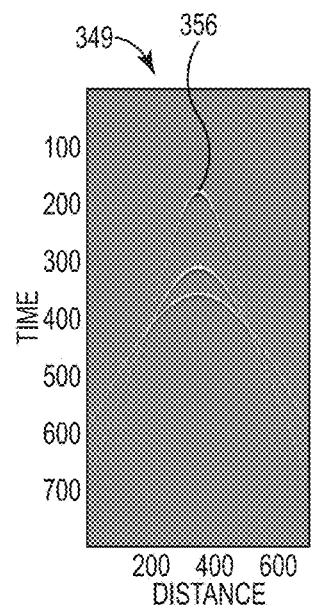

FIGS. 3D and 3E illustrate estimated deblended and deghosted seismic source responses. Response 354 is an estimated deblended and deghosted seismic source response associated with the first seismic source (and response 350-1). Response 356 is an estimated deblended and deghosted seismic source response associated with the second seismic source (and response 352-1). An inversion algorithm may be used to exploit the selective strengthening illustrated in FIGS. 3B and 3C to estimate individual deblended and deghosted seismic source responses like those illustrated in FIGS. 3D and 3E. In other words, the strengthened responses may be used to determine which seismic sources are generating energy and how much energy is generated at each seismic source. In an iterative inversion scheme, the strengthening may be used as the first steepest descend step. The iterative inversion scheme may try to explain the measured data in terms of the first deghosted and deblended source responses and the second deghosted and deblended source responses. In each iteration, the strengthening for those parts of the data that it has not yet explained may be used.

The data graphs of FIGS. 3A-3E illustrate that, during seismic data processing, a seismic source and its ghost may be used to strengthen responses as compared to a different seismic source and its ghost. In a stack configuration, for instance when two seismic sources are stacked on top of each other (at different depths), the seismic sources may be used together to strengthen the responses of actual seismic sources (no effect on the free surface). This may remove an assumption of the surface being a perfect acoustic mirror.

Figure 4:
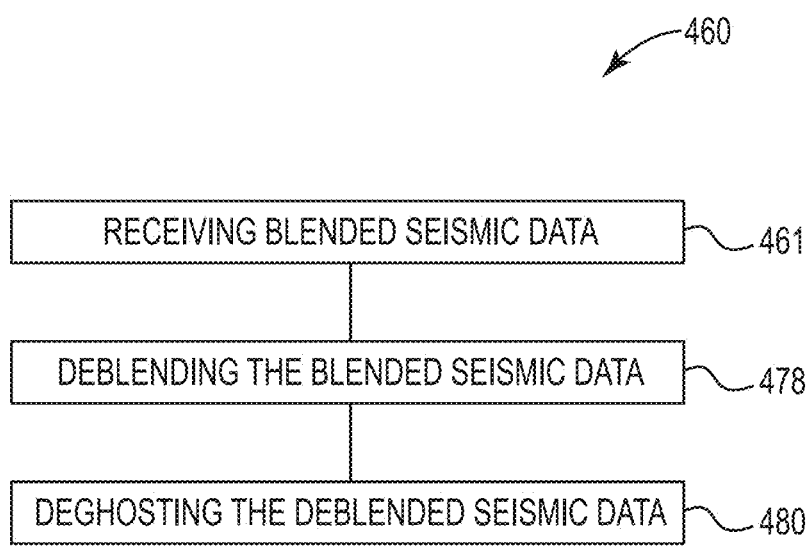
FIG. 4 illustrates a method flow diagram associated with deblended and deghosted seismic data.

FIG. 4 illustrates a method flow diagram 460 associated with deblended and deghosted seismic data. In at least one embodiment, the method may be performed using a machine. The machine may be a single machine such as a computing device, multiple machines, and/or any combination in a distributed network. At 461, blended seismic data is received. The blended seismic data may include a first set of seismic data received in response to actuation of a first seismic source located at a first depth and a second set of seismic data received in response to actuation of a second seismic source stacked with the first seismic source and located at a second depth. In at least one embodiment, the first set of seismic data and the second set of seismic data are received in response to an SLO acquisition. In another embodiment, the first set of seismic data and the second set of seismic data are received in response to simultaneous actuation of the first and the second seismic sources.

At 478 the blended seismic data is deblended, and at 480 the deblended seismic data is deghosted. In at least one embodiment, the seismic data is deblended based on a difference in ghost responses of the first seismic source and the second seismic source, and the deblended seismic data is deghosted based on the difference in ghost responses. For instance, seismic source actuations and their ghosts may be used during deblending and deghosting, as opposed to only actuation repetition. In at least one embodiment, seismic data is identified and blended before receiving the blended seismic data. As used herein, identifying the seismic data includes indicating or determining that seismic data is present. In at least one embodiment, two or more seismic sources and one or more seismic sensors may be towed, for instance via a cable, through a body of water above a subterranean formation, and the seismic data may be identified from the one or more seismic sensors. This data may then be processed. For instance, blended, deblended, and deghosted. In yet another embodiment, a deblended and deghosted seismic source response is based on the deblended and deghosted data.

In at least one embodiment, interfering seismic data is removed from the estimated seismic source response based on the deblended and deghosted seismic data, and the remaining seismic data is deghosted. As used herein, the remaining seismic data is seismic data that was not removed from the estimated seismic source response. The blended seismic data may include a plurality of sets of seismic data, each set within the plurality of sets received in response to actuation of an associated seismic source located at a particular depth, wherein the particular depth is different for each set within the plurality of sets.

Figure 5:
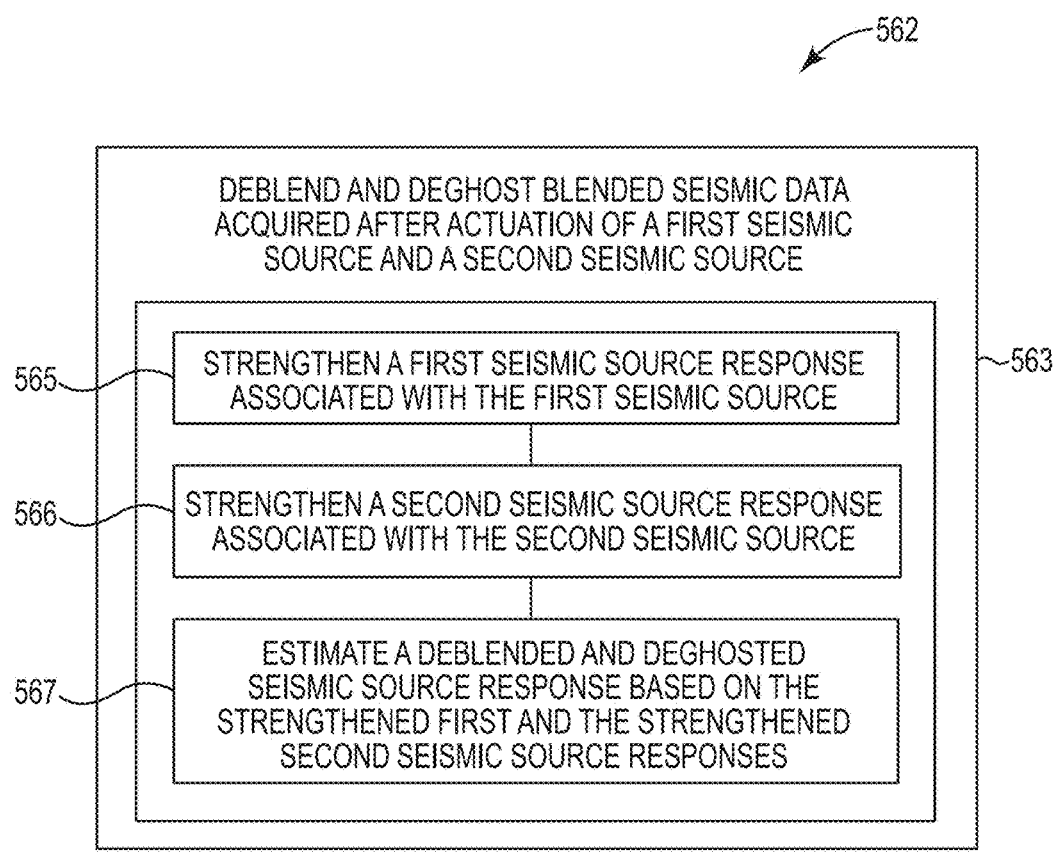
FIG. 5 illustrates a method flow diagram associated with deblended and deghosted seismic data.

FIG. 5 illustrates a method flow diagram 562 associated with deblended and deghosted seismic data. At 563, seismic data acquired after actuation of a first seismic source and a second seismic source may be deblended and deghosted. In at least one embodiment, deblending and deghosting the blended seismic data is based on difference in ghost responses of the first seismic source and the second seismic source. For instance, a first seismic source response may have a corresponding first ghost response, and second seismic source response may have a corresponding second ghost response. The depth of the first and the second seismic sources may affect the first and the second seismic source responses, as well as the corresponding ghost responses. The differences in the ghost responses may be used in deblending and deghosting.

In at least one embodiment, the deblending and deghosting may include strengthening a first seismic source response associated with the first seismic source, strengthening a second seismic source response associated with the second seismic source, and estimating a deblended and deghosted seismic source response based on the strengthened first and second seismic source responses.

In some examples, the blended seismic data may be deblended and deghosted based on a non-flat air-water surface. In other examples, it may be based on a not-fully-reflective air-water surface. For instance, an uneven sea surface, whether physically or reflectively uneven, may be considered during deblending and deghosting. In at least one example, the air-water surface may not act as a perfect acoustic mirror, so adjustments may be made, for instance in algorithms, to deghost without erroneous assumptions. If not considered, estimates may be less accurate, as seismic source and ghost responses may vary based on the sea state and its reflectivity.

An interfering blended seismic ghost response and/or an interfering blended seismic source response may be removed from the estimated deblended and deghosted seismic source response based on the deblended and deghosted data. For instance, seismic data associated with the first seismic source may be removed, and processing may be focused on seismic data associated with the second seismic source (and vice versa). In an example, removing interfering seismic data associated with the second seismic source may allow for an estimate for the first seismic source, a creation of an associated ghost, and deghosting of seismic data associated with the first seismic source, but not the second seismic source.

In a number of examples, blended seismic data acquired after actuation of a first seismic source at a first time and a second seismic source at a second time may be deblended and deghosted. The first and the second time, as used herein, are different times. Alternatively or additionally, blended seismic data acquired after simultaneous actuation of the first seismic source at a first depth and the second seismic source at a second depth may be deblended and deghosted. As used herein, simultaneous actuation occurs when the first seismic source and the second seismic source are actuated at approximately the same time.

Figure 6:
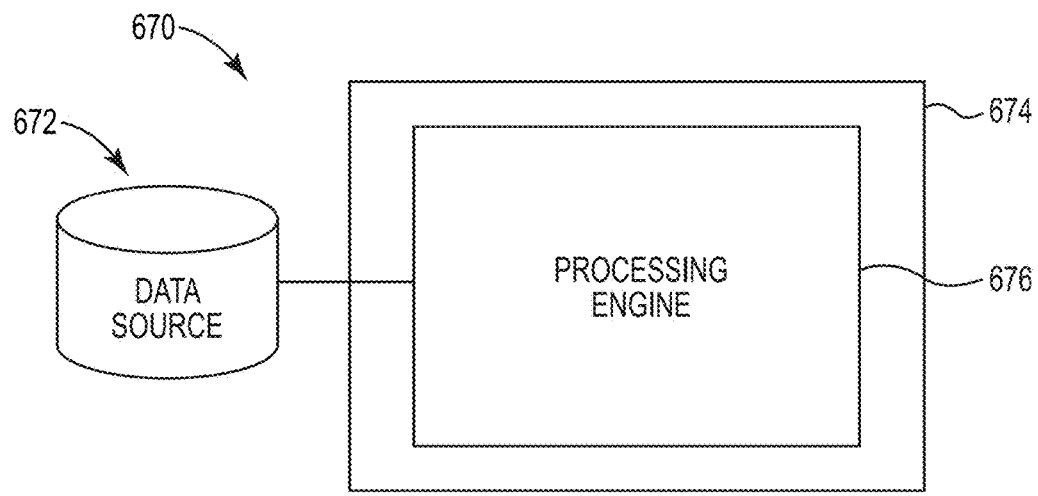
FIG. 6 illustrates a diagram of a system associated with deblended and deghosted seismic data.

FIG. 6 illustrates a diagram of a system 670 associated with deblended and deghosted seismic data. The system 670 may include a data source 672, a subsystem 674, and/or a number of engines such as acquisition engine 676 and may be in communication with the data source 672 (or data store) via a communication link. The system 670 may include additional or fewer engines than illustrated to perform the various functions described herein. The system may represent program instructions and/or hardware of a machine, for instance machine 784 as referenced in FIG. 7. As used herein, an "engine" may include program instructions and/or hardware, but at least includes hardware. Hardware is a physical component of a machine that enables it to perform a function. Examples of hardware may include a processing resource, a memory resource, a logic gate, etc.

The number of engines may include a combination of hardware and program instructions that is configured to perform a number of functions described herein. The program instructions, such as software, firmware, etc., may be stored in a memory resource such as a machine-readable medium, computer-readable medium, etc., as well as hard-wired program such as logic. Hard-wired program instructions may be considered as both program instructions and hardware.

The processing engine 676 may include a combination of hardware and program instructions configured to process blended seismic data acquired after actuation of a first seismic source located at a first depth and a second seismic source located at a second depth. Processing engine may include a combination of hardware and program instructions configured to deblend and deghost the blended seismic data based on a difference in ghost response of the first seismic source and the second seismic source. The blended seismic data may include a first seismic source response, a first ghost response associated with the first seismic source response, a second seismic source response, and a second ghost response associated with the second seismic source response. While two seismic sources are described herein, more or fewer seismic sources, associated ghosts, and associated responses may be used.

In at least one embodiment, the processing engine 676 may include a combination of hardware and program instructions configured to process the blended seismic data acquired after actuation at a first time of the first seismic source and actuation at a second time of the second seismic source. This blended seismic data may be processed, and the time differences may be used in deblending and deghosting including in deblending and deghosting algorithms.

In yet another embodiment, the processing engine 676, may include a combination of hardware and program instructions configured to process the blended seismic data acquired after iterative actuation of the first seismic source as a first time and actuation of the second seismic source at varying times. As used herein, iterative actuation is actuation performed in a repetitive manner. Put another way, seismic sources are repeatedly actuated. The iterations may occur at predetermined or random intervals. As used herein, varying times include non-patterned times.

The processing may include deblending and deghosting the blended seismic data based on a difference in ghost responses of the first seismic source and the second seismic source. The difference in ghost responses may be based on a difference between the first depth and the second depth. For instance, a first seismic source response may have a corresponding first ghost response, and second seismic source response may have a corresponding second ghost response. The depth of the first and the second seismic sources may affect the first and the second seismic source responses, as well as the corresponding ghost responses. The differences in the ghost responses may be used in deblending and deghosting. For instance, in deblending and deghosting algorithms.

In some examples of the present disclosure, the processed blended seismic data may be acquired after simultaneous actuation of the first seismic source and the second seismic source. In such an example, the first seismic source and the second seismic source may be in a stacked configuration.

The processed blended seismic data, in some instance, may be iteratively acquired. For example, the first seismic source may be iteratively actuated at a first time, and the second seismic source may be iteratively actuated at varying times. Such an example allows for a constant actuation time for the first seismic source and random actuation times for the second seismic source. Iterative actuations may also allow for an accurate deblended and deghosted seismic source response estimation.

Figure 7:
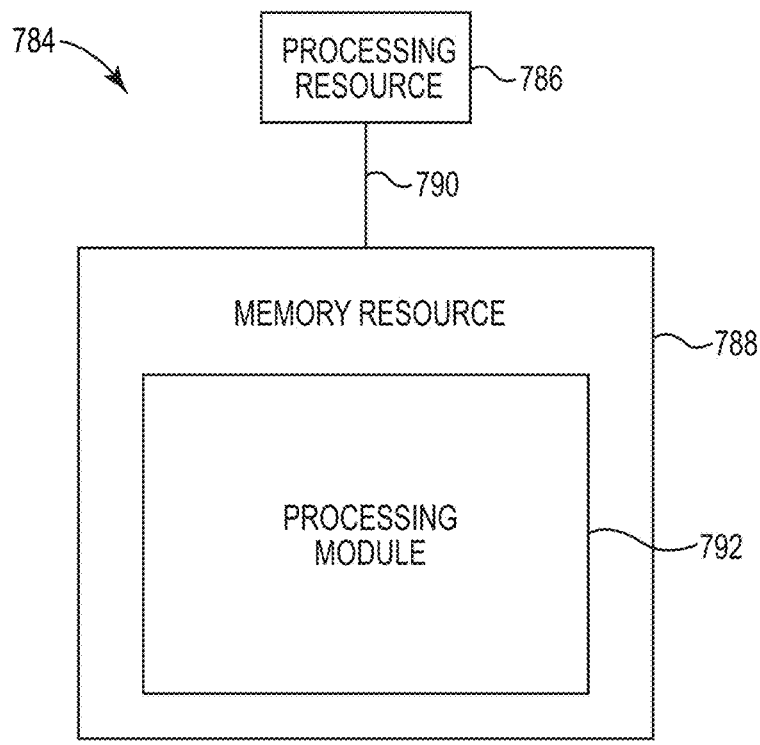
FIG. 7 illustrates a diagram of a machine associated with deblended and deghosted seismic data.

FIG. 7 illustrates a diagram of a machine 784 associated with deblended and deghosted seismic data. The machine 784 may utilize software, hardware, firmware, and/or logic to perform a number of functions. The machine 784 may be a combination of hardware and program instructions configured to perform a number of functions and/or actions. The hardware, for example, may include a number of processing resources 786 and a number of memory resources 788, such as a machine-readable medium or other memory resources 788. The memory resources 788 may be internal and/or external to the machine 784, for example, the machine 784 may include internal memory resources and have access to external memory resources. The program instructions, such as machine-readable instructions, may include instructions stored on the machine-readable medium to implement a particular function, for example, an action such as reconstructing a wavefield. The set of machine-readable instructions may be executable by one or more of the processing resources 786. The memory resources 788 may be coupled to the machine 784 in a wired and/or wireless manner. For example, the memory resources 788 may be an internal memory, a portable memory, a portable disk, and/or a memory associated with another resource, for example, enabling machine-readable instructions to be transferred and/or executed across a network such as the Internet. As used herein, a "module" may include program instructions and/or hardware, but at least includes program instructions.

Memory resources 788 may be non-transitory and may include volatile and/or non-volatile memory. Volatile memory may include memory that depends upon power to store information, such as various types of dynamic random access memory among others. Non-volatile memory may include memory that does not depend upon power to store information. Examples of non-volatile memory may include solid state media such as flash memory, electrically erasable programmable read-only memory, phase change random access memory, magnetic memory, optical memory, and/or a solid state drive, etc., as well as other types of non-transitory machine-readable media.

The processing resources 786 may be coupled to the memory resources 788 via a communication path 790. The communication path 790 may be local or remote to the machine 784. Examples of a local communication path 790 may include an electronic bus internal to a machine, where the memory resources 788 are in communication with the processing resources 786 via the electronic bus. Examples of such electronic buses may include Industry Standard Architecture, Peripheral Component Interconnect, Advanced Technology Attachment, Small Computer System Interface, Universal Serial Bus, among other types of electronic buses and variants thereof. The communication path 790 may be such that the memory resources 788 are remote from the processing resources 786, such as in a network connection between the memory resources 788 and the processing resources 786. That is, the communication path 790 may be a network connection. Examples of such a network connection may include a local area network, wide area network, personal area network, and the Internet, among others.

As shown in FIG. 7, the machine-readable instructions stored in the memory resources 788 may be segmented into a number of modules 792 that when executed by the processing resources 786 may perform a number of functions. One module is illustrated in FIG. 7, but more modules may be present. As used herein, a module includes a set of instructions included to perform a particular task or action. The number of modules may be sub-modules of other modules. For example, the processing module 792 may be a sub-module of a deblending and/or a deghosting module (not illustrated) and/or process module 792 and/or the deblending and deghosting modules may be contained within a single module. The deblending and deghosting modules may include instructions executable to deblend and deghost blended seismic data acquired after actuation of a first seismic source and a second seismic source. Furthermore, the number of modules may comprise individual modules separate and distinct from one another. Examples are not limited to the specific module 792 illustrated in FIG. 7.

Each of the number of modules may include program instructions and/or a combination of hardware and program instructions that, when executed by a processing resource 786, may function as a corresponding engine as described with respect to FIG. 6. For example, the processing module 792 may include program instructions and/or a combination of hardware and program instructions that, when executed by a processing resource 786, may function as the processing engine 676.

In accordance with a number of embodiments of the present disclosure, a geophysical data product may be produced. Geophysical data may be obtained and stored on a non-transitory, tangible machine-readable medium. In at least one embodiment, obtaining the geophysical data product includes towing two or more seismic sources and one or more seismic sensors, for instance on a cable, through a body of water above a subterranean formation and obtaining the geophysical data from the one or more seismic sensors. The two or more seismic sources may be towed in line with one after another.

The geophysical data product may be produced by processing the geophysical data offshore or onshore either within the United States or in another country. If the geophysical data product is produced offshore or in another country, it may be imported onshore to a facility in the United States. The geophysical data product may be recorded on a non-transitory machine-readable medium suitable for importing onshore.

In some instances, once onshore in the United States, geophysical analysis may be performed on the geophysical data product. In some instances, geophysical analysis may be performed on the geophysical data product offshore. For example, blended seismic data acquired after actuation of a first seismic source located at a first depth and a second seismic source located at a second depth may be processed. The processing may comprise deblending and deghosting the blended seismic data based on a difference in ghost responses of the first seismic source and the second seismic source.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system, comprising:
   a data store; and
   a processing hardware engine configured to process blended seismic data stored in the data store and acquired after actuation of a first seismic source located at a first depth and actuation of a second seismic source located at a second depth by deblending and deghosting the blended seismic data based on a difference in ghost responses of the first seismic source and the second seismic source resulting from a difference between the first and the second depth,
       wherein the deblending comprises the processing hardware engine configured to strengthen a response of the first seismic source and a response of the second seismic source using wavefield extrapolation.

2. The system of claim 1, the processing hardware engine configured to process the blended seismic data acquired after actuation at a first time of the first seismic source and actuation at a second time of the second seismic source.

3. The system of claim 1, the processing hardware engine configured to process the blended seismic data acquired after iterative actuation of the first seismic source at a first time and actuation of the second seismic source at varying times.

4. The system of claim 1, wherein the blended seismic data comprises:
   a first seismic source response;
   a first ghost response associated with the first seismic source response;
   a second seismic source response; and
   a second ghost response associated with the second seismic source response.

5. A method, comprising:
   acquiring blended seismic data from a data store, the blended seismic data including:
       a first set of seismic data received in response to actuation of a first seismic source located at a first depth; and
       a second set of seismic data received in response to actuation of a second seismic source stacked with the first seismic source and located at a second depth;
   deblending the blended seismic data based on a difference in ghost responses of the first seismic source and the second seismic source,
       wherein the deblending comprises strengthening a response of the first seismic source and a response of the second seismic source using wavefield extrapolation; and
   deghosting the deblended seismic data based on the difference in ghost responses and the deblending.

6. The method of claim 5, further comprising:
   identifying seismic data; and
   blending the seismic data before receiving the blended seismic data.

7. The method of claim 5, further comprising estimating a deblended and deghosted seismic source response based on the deblended and deghosted seismic data.

8. The method of claim 5, further comprising:
   removing interfering seismic data from the estimated seismic source response based on the deblended and deghosted seismic data; and
   deghosting remaining seismic data.

9. The method of claim 5, wherein the first set of seismic data and the second set of seismic data are acquired in response to simultaneous actuation of the first and the second seismic sources.

10. The method of claim 5, wherein the blended seismic data includes a plurality of sets of seismic data, each set within the plurality of sets acquired in response to actuation of an associated seismic source located at a particular depth, wherein the particular depth is different for each set within the plurality of sets.

11. The method of claim 5, wherein the first set of seismic data and the second set of seismic data are acquired in response to a simultaneous long offset (SLO) acquisition.

12. The method of claim 5, further comprising:
   towing two or more seismic sources and a plurality of seismic sensors through a body of water above a subterranean formation; and
   identifying the seismic data from the plurality of seismic sensors.

13. The method of claim 5, wherein strengthening comprises increasing clarity and focus of the first set of seismic data and the second set of seismic data.

14. The method of claim 5, further comprising:
   determining which of the first and the second seismic sources is generating energy;
   responsive to a determination that the first seismic source is generating energy, determine how much energy is generated by the first seismic source; and
   responsive to a determination that the second seismic source is generating energy, determine how much energy is generated by the second seismic source.

15. A method of generating a geophysical data product, the method comprising:
   obtaining geophysical data;
   processing the geophysical data to generate the geophysical data product, wherein processing the geophysical data comprises:
      processing blended seismic data received in response to actuation of a first seismic source located at a first depth and actuation of a second seismic source located at a second depth, wherein processing comprises:
      deblending and deghosting the blended seismic data based on a difference in ghost responses of the first seismic source and the second seismic source,
         wherein the deblending comprises strengthening a response of the first seismic source and a response of the second seismic source using wavefield extrapolation.

16. The method of claim 15, further comprising recording the geophysical data product on a non-transitory machine-readable medium suitable for importing onshore.

17. The method of claim 15, wherein processing the geophysical data comprises processing the geophysical data offshore or onshore.

18. The method of claim 15, wherein obtaining geophysical data comprises:
   towing two or more seismic sources and a plurality of seismic sensors through a body of water above a subterranean formation; and
   obtaining the geophysical data from the plurality of seismic sensors.

19. The method of claim 18, wherein the two or more seismic sources are towed in line with one after another.

* * * * *